United States Patent
Drenckhahn et al.

(10) Patent No.: US 9,583,804 B2
(45) Date of Patent: Feb. 28, 2017

(54) ELECTRICAL ENERGY STORE

(71) Applicant: Siemens Aktiengesellschaft, Munich (DE)

(72) Inventors: Wolfgang Drenckhahn, Erlangen (DE); Horst Greiner, Forchheim (DE); Norbert Kellner, Kleinsendelbach (DE); Harald Landes, Ruckersdorf (DE); Roland Reichenbacher, Wachenroth (DE)

(73) Assignee: Siemens Aktiengesellschaft, Munich (DE)

( * ) Notice: Subject to any disclaimer, the term of this patent is extended or adjusted under 35 U.S.C. 154(b) by 78 days.

(21) Appl. No.: 14/429,073

(22) PCT Filed: Sep. 10, 2013

(86) PCT No.: PCT/EP2013/068710
§ 371 (c)(1),
(2) Date: Mar. 18, 2015

(87) PCT Pub. No.: WO2014/048724
PCT Pub. Date: Apr. 3, 2014

(65) Prior Publication Data
US 2015/0249279 A1    Sep. 3, 2015

(30) Foreign Application Priority Data
Sep. 25, 2012 (DE) .................. 10 2012 217 290

(51) Int. Cl.
*H01M 12/08* (2006.01)
(52) U.S. Cl.
CPC .................. *H01M 12/08* (2013.01)

(58) Field of Classification Search
None
See application file for complete search history.

(56) References Cited

U.S. PATENT DOCUMENTS

| 2011/0033769 A1 | 2/2011  | Huang et al. |
| 2013/0183595 A1 | 7/2013  | Greiner et al. |
| 2013/0323593 A1 | 12/2013 | Becker et al. |
| 2015/0056522 A1 | 2/2015  | Drenkhahn et al. |

FOREIGN PATENT DOCUMENTS

| DE | 102010041019 A1 | 3/2012 |
| DE | 102011004183 A  | 8/2012 |
| JP | S63138668 A     | 6/1988 |

(Continued)

OTHER PUBLICATIONS

JP Office Action, dated May 10, 2016, for JP application No. 2015-532370.

*Primary Examiner* — Patrick Ryan
*Assistant Examiner* — Wyatt McConnell
(74) *Attorney, Agent, or Firm* — Beusse Wolter Sanks & Maire

(57) ABSTRACT

An energy store is provided, having at least one stack, each stack having at least one storage cell, which in turn has an air electrode and a storage electrode. The storage electrode is adjacent to channels, which contain a storage medium and water vapor. The channels have a larger cross-sectional area than the cross-section of the storage medium, which condition causes unhindered spreading of a reaction gas in the area between the storage electrode and the storage medium.

10 Claims, 3 Drawing Sheets

(56) References Cited

FOREIGN PATENT DOCUMENTS

| | | |
|---|---|---|
| JP | 2013502039 A | 1/2013 |
| JP | 2015516651 A | 6/2015 |
| WO | 03001617 A2 | 1/2003 |
| WO | 2012123259 A1 | 9/2012 |
| WO | 2013110509 A2 | 8/2013 |

ELECTRICAL ENERGY STORE

CROSS REFERENCE TO RELATED APPLICATIONS

This application is the U.S. National Stage of International Application No. PCT/EP2013/068710 filed 10 Sep. 2013, and claims the benefit thereof. The International Application claims the benefit of German Application No. DE 102012217290.4 filed 25 Sep. 2012. All of the applications are incorporated by reference herein in their entirety.

FIELD OF INVENTION

The invention relates to an electrical energy store.

BACKGROUND OF INVENTION

For the storage of excess electrical current which occurs, for example, when current is being generated by means of renewable energy sources or by power stations operated in the optimum efficiency range and for which there is temporarily no demand in the network, various technical alternatives are adopted. One of these is the rechargeable oxide battery (ROB). ROBs are conventionally operated at temperatures of between 600° C. and 800° C. In this case, oxygen, which is supplied at an air electrode of the electrical cell, is converted into oxygen ions, transported through a solid electrolyte and brought to the opposite storage electrode. A redox reaction takes place there, which, depending on the charging or discharging process, absorbs or generates electrical current. On account of the high temperatures required for this process, the choice of material for the cell materials used and the design of the cell parts and also the arrangement of the storage medium are highly complex. In particular, the individual components deteriorate after a plurality of redox cycles which are operated at said operating temperatures.

SUMMARY OF INVENTION

An object of the invention, therefore, is to provide an electrical energy store which, as compared with the prior art, has higher reliability, along with constant energy absorption capacities.

A solution for achieving this object lies in an electrical energy store according to the claims.

The energy store according to aspects of the invention as claimed has at least one storage cell which, if appropriate, may be an integral part of a stack, the storage cell comprising an air electrode and a storage electrode, and the storage electrode having adjacent to it ducts in which, on the one hand, a storage medium is positioned and in which, moreover, steam, in particular a steam/water mixture, is contained. The energy store is distinguished in that the ducts have a larger cross-sectional area than the cross section of the storage medium contained therein. The effect of this is that an additional space, which is designated hereafter as a gas duct, is provided along the duct between the storage electrode and the storage medium.

This gas duct has a plurality of advantageous effects. Since a shuttle gas, which, in particular, contains hydrogen and water and which is dealt with in more detail hereafter, can freely flow and diffuse in this gas duct, the result of this is that all regions, even regions in the middle of the duct, are always supplied homogenously with the shuttle gas which, for example, is necessary for initial reduction. A homogenous supply of the storage medium over the entire duct length ensures optimum utilization of the entire storage capacity of the energy storage cell and therefore of the electrical energy store. This leads, in turn, to a constant energy absorption capacity of the energy store and, last but not least, to a longer service life. Furthermore, by means of these gas ducts, a lack of shuttle gas, which may be due, for example, to a leak of the overall energy store, can be compensated. Furthermore, when the energy store is being put into operation or during maintenance work upon it, an appropriate reaction gas, such as, for example, pure hydrogen, can be introduced from outside, in order to achieve an overall reduction of the storage medium which is advantageous when the store is deactivated.

It became apparent that it was appropriate if the storage medium is arranged at a distance from the storage electrode so that the gas duct is located between the storage electrode and the storage medium.

For this purpose, it is expedient, in turn, to provide a fixing device which fixes the storage medium to the duct walls. A fixing device is understood, in principle, to mean any fixing means which enables the storage medium to be arranged in the ducts such that a distance from the storage electrode or the duct walls can be ensured. This may, in particular, also be a clamping device, for example an undercut in the ducts or mechanical fastening.

It became apparent that it was appropriate to configure the fixing device in the form of a net, in particular of a metallic net. This metallic net, in turn, may be nickel-based. The net in this case runs essentially parallel to the storage electrode in the ducts. In this case, it is advantageously fastened to two duct walls running parallel to one another.

The fastening of the net to the duct walls may take place, for example, by means of a spot welding method, but it may also be fastened to a frame which, in turn, has two frame flanks which run parallel to the duct walls and between which the net is fastened.

The cross-sectional area of the ducts may be at least 5% larger than the cross-sectional area of the storage medium. This, in turn, means that the gas ducts have a cross-sectional area which amounts to at least 5% of the cross-sectional area of the storage medium. This duct cross section of at least 5% of the storage medium has proved to be expedient in order to ensure sufficient freedom of movement of the shuttle gas along the gas duct.

Furthermore, it became apparent that it was expedient if the storage medium has diffusion ducts which have a diameter of more than 0.5 mm and which run essentially perpendicularly to the storage electrode. The diffusion ducts, which are macroscopic with respect to a porosity of the storage medium, ensure, in turn, the gas transport of the shuttle gas even into the volume material of the storage medium.

Further features and further advantageous embodiments of the invention are explained in more detail by means of the following figures. These embodiments are merely by way of example and do not constitute any restriction of the scope of protection.

DETAILED DESCRIPTION OF INVENTION

Figure 1:
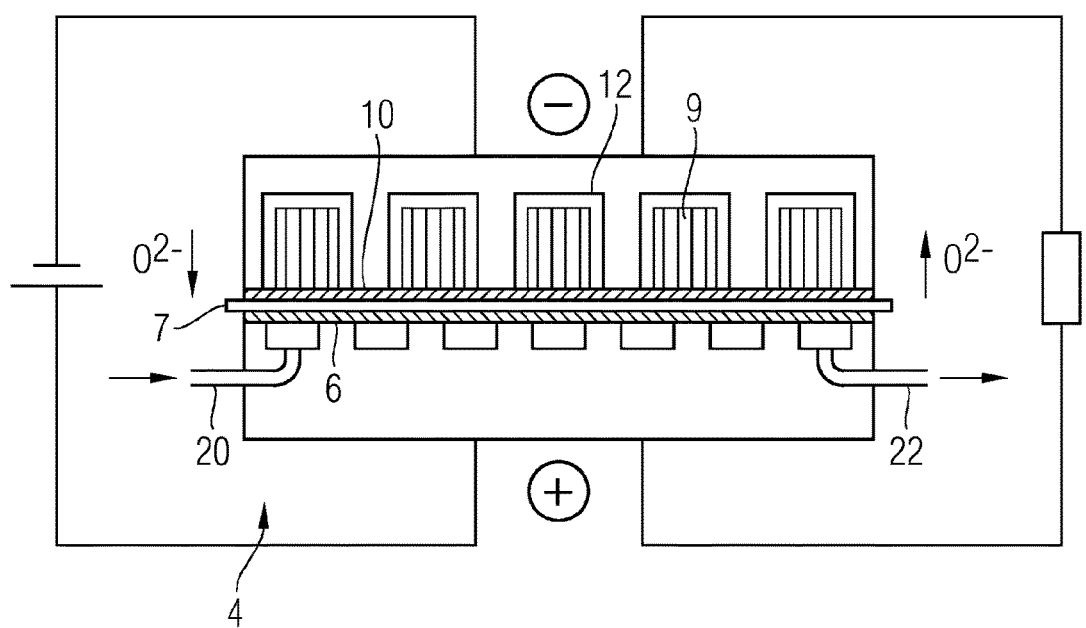
FIG. 1 shows a diagrammatic illustration of a cell of a rechargeable oxide battery.

The working of a rechargeable oxide battery (ROB) will first be described diagrammatically by means of FIG. 1, in as much as is necessary for the present description of the invention. In a conventional set-up of an ROB, a process gas, in particular air, is injected via a gas supply 20 at a positive electrode 6 which is also designated as an air electrode, oxygen being extracted from the air. The oxygen passes in the form of oxygen ions $O^{2-}$ through a solid electrolyte 7, resting against the positive electrode, to a negative electrode 10 which is also designated as a storage electrode. If, then, a dense layer of the active storage material were present on the storage electrode at the negative electrode 10, the charging capacity of the battery would quickly be exhausted.

For this reason, it is expedient to use as energy storage medium at the negative electrode 10 a storage medium 9 composed of porous material which contains a functionally acting oxidizable material as an active storage material, for example in the form of iron and iron oxide.

Via a redox pair, for example $H_2/H_2O$, which is gaseous in the operating state of the battery, the oxygen ions transported through the solid electrolyte 7 are transported through pore ducts of the porous storage medium 9, which pore ducts the active storage material comprises. Depending on whether a charging or a discharging operation is taking place, the metal or the metal oxide (iron/iron oxide) is oxidized or reduced, and the oxygen required for this purpose is delivered or transported back to the solid electrolyte 7 by means of the gaseous redox pair $H_2/H_2O$. This mechanism is designated as a shuttle mechanism.

The advantage of iron as oxidizable material, that is to say as active storage material, is that, during its oxidation process, it has approximately the same open-circuit voltage of about 1 V as the redox pair $H_2/H_2O$.

One advantage of the ROB is that it can be extended almost unrestrictedly in modular form, using its smallest unit, to be precise the storage cell 4. A small battery for stationary domestic use can therefore be produced in just the same way as a large-scale plant for storing the energy of a power station.

Figure 2:
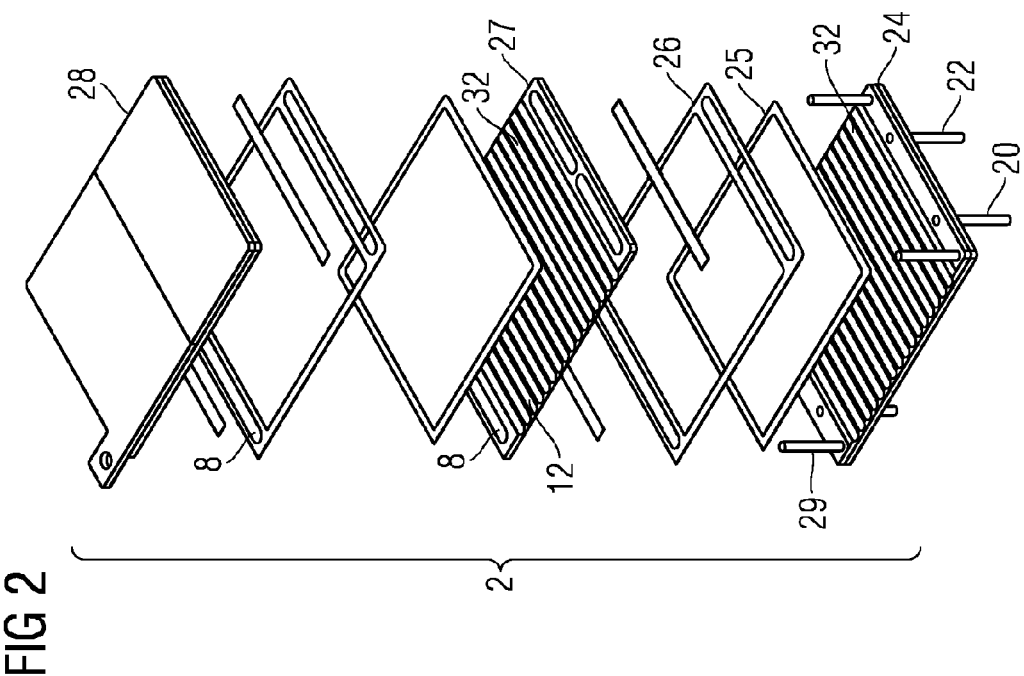
FIG. 2 shows an exploded illustration of a stack, as seen from above.

A plurality of the storage cells 4 described in FIG. 1 are combined into what is known as a stack 2. The set-up of a stack 2 and the arrangement of the storage cells 4 in the stack 2 are made clear by means of the exploded illustrations in FIG. 2 and FIG. 3. FIG. 2 illustrates the set-up of a stack which is seen from above and in this case is assembled in order from the bottom upward. The stack 2 comprises first a baseplate 24 which, if appropriate, is composed of a plurality of individual plates which, in turn, have functional structurings and depressions, for example, for the air routing. This assembly of individual plates, which is not described in any more detail here, to form the baseplate 24 takes place, for example, by means of a brazing method.

The baseplate 24 has an air supply 20 and an air discharge 22, and, as already described, as a result of the assembly of individual plates, ducts for the air supply, which cannot be seen here, are integrated in the baseplate 24. Furthermore, the baseplate 24 has centering bolts 29, onto which further components of the stack 2 are then attached and centered. There follows as the next layer an electrode structure 25 which comprises, in particular, the already described positive electrode 6, the solid electrolyte 7 and the storage electrode 10. This is a self-supporting ceramic structure, onto which the individual functional regions, such as the electrodes or the solid electrolyte, are attached by a thin film method.

There follows as a further layer a seal 26 which is composed, for example, of a high temperature-resistant glass frit which seals off the individual plates of the stack 2 at the operating temperatures of the battery. The next following plate is what is known as an interconnector plate 27 which has two functionally acting sides. In this example, an air side 34 of a storage cell 4 and the air supply ducts, not illustrated in any more detail here, are introduced on the lower side of said interconnector plate, as seen with respect to FIG. 2. At its top side (storage side 32), the interconnector plate 27 has ducts 12, into which the storage medium 9 is introduced. The top side of the interconnector plate 27 in FIG. 2 has the same structure as the top side of the baseplate 24. Here, too, the ducts 12 for introducing the storage medium 9 are provided. This side having the ducts 12 in each case faces the storage electrode 10 of the storage cell 4.

A further iteration of the sequence of the electrode structure 25, the sealing 26 and a then following closing plate 28, to form the overall set-up of the stack 2, is illustrated by way of example in FIG. 2. In principle, of course, a series of further iterations of these components, in particular a plurality of sequences of interconnector plates, may also follow, so that a stack conventionally has between 10 and 20 layers of storage cells 4.

Figure 3:
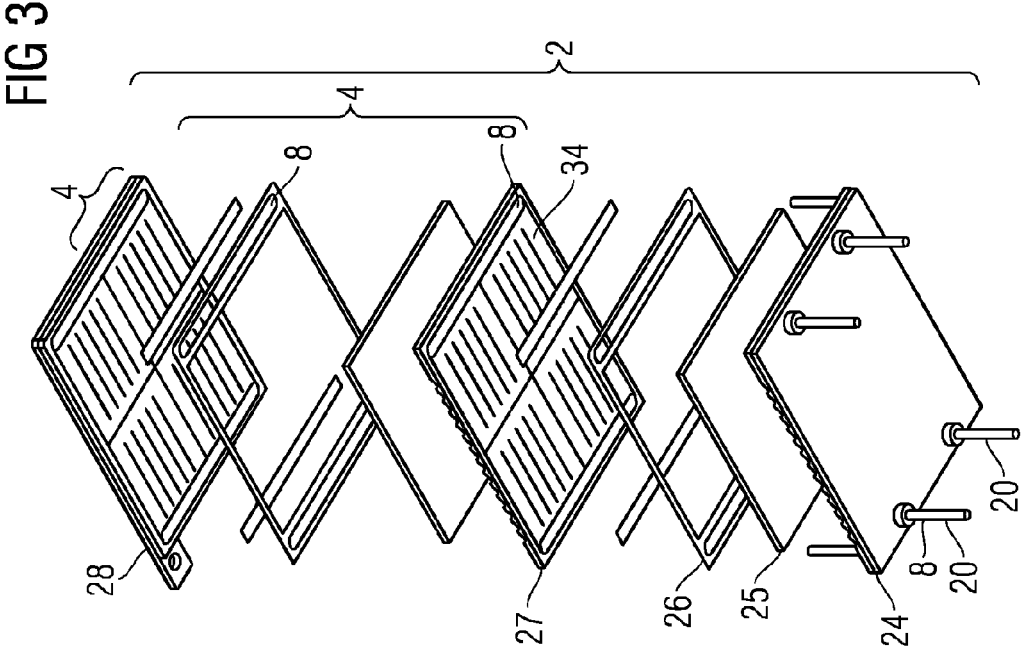
FIG. 3 shows an exploded illustration of the stack from FIG. 2, as seen from below.

The same stack 2 which is described in FIG. 2 is illustrated in the opposite viewing direction in FIG. 3. In FIG. 3, the baseplate 24 is viewed from below, being followed, in turn, by the electrode structure 25 of the sealing 26, and the interconnector plate 27 can in this case likewise be seen from below, the eye being directed here to the side which faces the air electrode (air side 34). This example illustrates on the interconnector plate four separate regions on the air side 34 which form the subdivision into four individual storage cells 4 per stack layer (in this case the subdivision into four storage cells is to be considered merely as an example). The storage cell 4 is therefore composed in this example of one quarter of the area of the respective interconnector plate or the baseplate 24 or the top plate 28. Furthermore, the respective cell 4 is formed by sequence of the respective air side 34, seal 26, electrode structure 25 and again in each case one quarter of the storage side 32 of the baseplate 24 or of the interconnector plate 27. The air side 34 is in this case supplied with air as the process gas by an air supply device 8 (also called a manifold) which is not illustrated in any more detail here and which in this case comprises a plurality of components in the stack.

Figure 4:
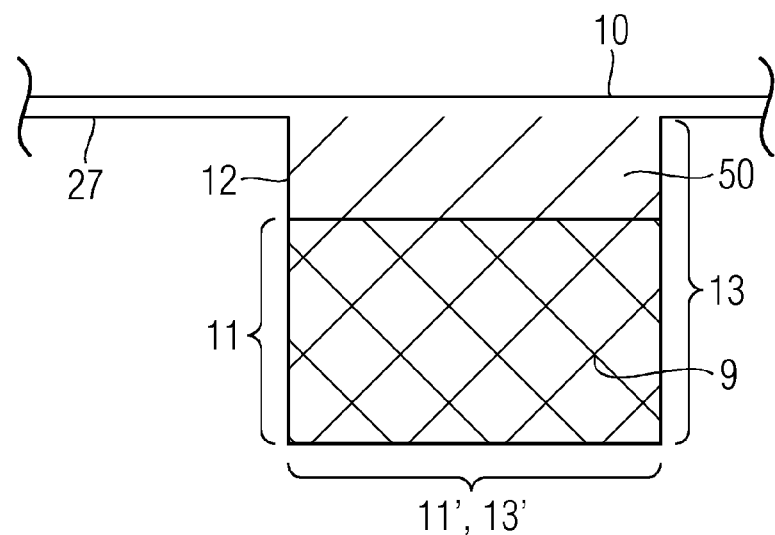
FIG. 4 shows an enlarged diagrammatic illustration of a cross section of a duct with a storage medium.

As already stated, an oxidation or reduction reaction takes place between the shuttle gas, which is usually composed of a mixture of steam and hydrogen, and the storage medium, which contains an iron oxide or ion. In order to keep the concentration of shuttle gas as constant as possible at every point of the storage medium, so that a continuous reaction of the overall storage medium can be implemented, it is expedient, according to FIG. 4, to arrange the storage medium 9 in the duct 12 in such a way as to give rise parallel to the storage electrode 10 to a gas duct 50 in which the shuttle gas can spread out, as unobstructed as possible, by diffusion and flow.

In this case, the duct 12 has overall a cross-sectional area which is composed of the lengths under the curly brackets 13 and 13'. By contrast, the storage medium 9 has a smaller cross section which is composed of the lengths under the curly brackets 11 and 11', the length 11' in this embodiment being equated with the length 13'. Thus, between the storage medium 9 and the storage electrode 10, the gas flow duct 50 is formed, in which the shuttle gas $H_2O/H_2$ can flow and diffuse, unobstructed, along the storage medium, so that a constant partial pressure of the shuttle gas prevails on the surface of the storage medium 9.

In order to fix the storage medium 9 in the ducts 12, a fixing device is provided, which, in principle, may be present in various embodiments. For example, the ducts 12 may have undercuts, not illustrated here, which clamp the storage medium 9 at the desired location in the duct 12. In principle, movable fixing noses may also be arranged in the ducts 12 and likewise exert a clamping action with respect to the storage medium 9. However, due to punctiform load upon the per se brittle material of the storage medium 9, undesirable damage to the storage medium 9 may occur. Moreover, the storage medium may experience longitudinal expansions owing to chemical transformation during the operation of the storage cell. In this case, punctiform fixing of the storage medium 9 is likewise unbeneficial, since it may entail considerable compressive loads or compressive stresses in the storage medium 9. It therefore became apparent that it was expedient to attach in the duct 12 a net 40 which, in particular, is of nickel-based form, this net having some stretchability and thus preventing punctiform load upon the storage medium 9, the storage medium 9 nevertheless being arranged at a fixed location in the duct 12. This net 40 may also be designated as a fixing device 36.

The term "net" is to be understood in principle to mean a fabric which may be configured, for example, in the form of a braided fabric, but also in the form of a knit. In principle, the term "net" also embraces individual tensioned wires which run between the duct walls 38. Irrespective of the configuration of the net, it proved appropriate to have a mesh width which lies between 30 μm and 300 μm, the wire thickness for example lying between 10 μm and 100 μm. With the mesh width described, in conjunction with the wire thickness described, the storage medium 9 is held securely in the ducts, and with these parameters the net has a sufficiently high elasticity, although no material of the storage medium 9 creeps through the meshes.

Figure 5:
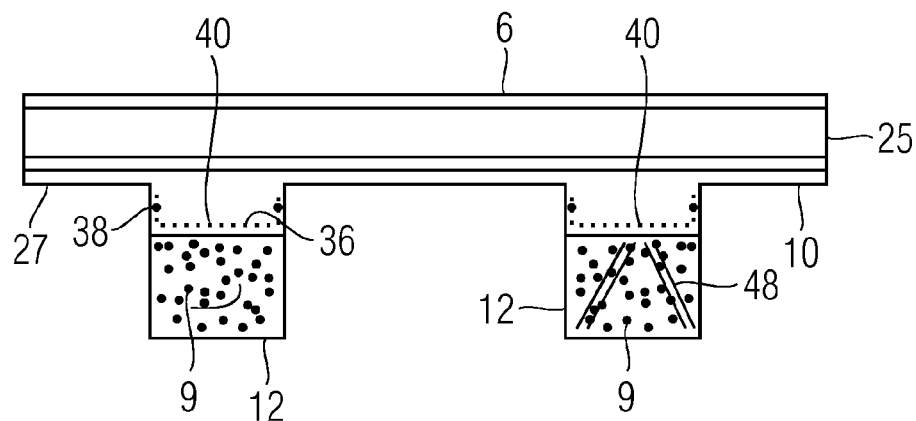
FIG. 5 shows a diagrammatic cross section through a duct with a fixing device.

As illustrated in FIG. 5, the net 40 is fastened by spot welding to walls 38 of the ducts 12 between the electrode structure 25 which has the storage electrode 10 in the direction of the storage side 32 of the interconnector plate 27. For this purpose, first, the storage medium 9 is introduced into the ducts 12 of the interconnector plate 27, and subsequently a net is drawn over the storage side 32 and is pressed into the depressions of the ducts. Thereafter, a corresponding number of weld spots are placed in each case at regular intervals along the ducts by means of a spot welding apparatus, so that the net 40 lies directly on the storage medium 9 and presses the latter sufficiently firmly into the ducts 12, the net being sufficiently elastic to compensate reduction-induced and thermally induced changes in volume of the storage medium. The storage medium 9 is thus fixed to the duct walls 38 in the ducts 12 by the net 40.

Figure 6:
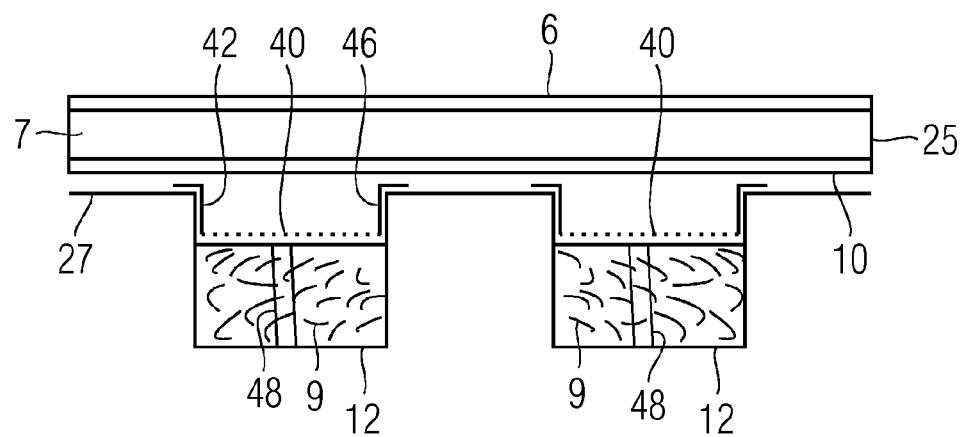
FIG. 6 shows a cross section, as in FIG. 5, with a fixing device in alternative embodiments.

In an alternative embodiment according to FIG. 6, a frame 42 is provided, which projects partially into the ducts 12 and to the frame flanks 46 of which the net 40 is fastened. The frame 42 is likewise laid onto the storage side 32 of the interconnector plate 27 and may be individual frames for each duct 12 or an overall frame which covers the entire interconnector plate 27 and has in each case individual depressions in the ducts 12.

Moreover, it may be expedient to introduce macroscopic diffusion ducts 48 in the storage medium 9, for example by means of bores or spacers, during the manufacturing process (also pore formers). The term "macroscopic" is understood in this case to mean that the diffusion ducts 48 have an at least tenfold diameter with respect to the conventional porosity of the storage medium 9, so that sufficient shuttle gas can flow, unobstructed, through the diffusion ducts 48 deep into the interior of the storage medium 9. These diffusion ducts 48, which conventionally have an extent of more than 0.5 mm, advantageously run in their preferential direction away from the storage electrode 10. In this case, they may stand perpendicularly to the storage electrode 10, as illustrated in FIG. 6, or they may run at angles, as illustrated in FIG. 5.

The invention claimed is:

1. An energy store comprising:
   at least one stack, each stack comprising at least one storage cell, each cell comprising an air electrode and a storage electrode, the storage electrode being adjacent to ducts which contain a storage medium and steam, wherein the ducts have a larger cross sectional area than a cross sectional area of the storage medium.

2. The energy store as claimed in claim 1, further comprising
   a fixing device for fixing the storage medium to duct walls.

3. The energy store as claimed in claim 2,
   wherein the storage medium is fixed in the ducts by the fixing device such that the storage medium is arranged at a distance from the storage electrode.

4. The energy store as claimed in claim 2,
   wherein the fixing device is configured in the form of a net.

5. The energy store as claimed in claim 4,
   wherein the net is nickel-based.

6. The energy store as claimed in claim 1,
   wherein the cross sectional area of the ducts is at least 5% larger than the cross sectional area of the storage medium.

7. The energy store as claimed in claim 4,
   wherein the net is arranged essentially parallel to the storage electrode along the duct.

8. The energy store as claimed in claim 4,
   wherein the net is arranged on a frame which is fastened at least partially to two frame flanks running parallel to duct walls, and the net is fastened between the two frame flanks.

9. The energy store as claimed in claim 1, further comprising
   diffusion ducts in the storage medium, which have a diameter of more than 0.5 mm and which run essentially perpendicularly to the storage electrode.

10. The energy store as claimed in claim 4,
    wherein the fixing device is configured in the form of a metallic net.

* * * * *